US010877603B2

(12) United States Patent
Yoo et al.

(10) Patent No.: US 10,877,603 B2
(45) Date of Patent: Dec. 29, 2020

(54) METHOD FOR PRINTING TOUCH PANEL COVER GLASS AND TOUCH PANEL COVER GLASS MANUFACTURED BY USING SAME

(71) Applicant: LG CHEM, LTD., Seoul (KR)

(72) Inventors: Jae-Hyun Yoo, Daejeon (KR); Mi-Kyoung Kim, Daejeon (KR); Joon-Hyung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 54 days.

(21) Appl. No.: 15/757,215

(22) PCT Filed: Nov. 28, 2016

(86) PCT No.: PCT/KR2016/013809
§ 371 (c)(1),
(2) Date: Mar. 2, 2018

(87) PCT Pub. No.: WO2017/091052
PCT Pub. Date: Jun. 1, 2017

(65) Prior Publication Data
US 2018/0275787 A1    Sep. 27, 2018

(30) Foreign Application Priority Data

Nov. 27, 2015    (KR) .................. 10-2015-0167978

(51) Int. Cl.
*G06F 3/042*    (2006.01)
*B41J 3/407*    (2006.01)
(Continued)

(52) U.S. Cl.
CPC .............. *G06F 3/042* (2013.01); *B41J 3/407* (2013.01); *B41J 11/002* (2013.01); *G02B 5/208* (2013.01);
(Continued)

(58) Field of Classification Search
CPC ........... G06F 3/042; G06F 2203/04103; G06F 2203/04108; B41J 3/407; B41J 11/002;
(Continued)

(56) References Cited

U.S. PATENT DOCUMENTS

| 5,514,502 A * | 5/1996 | Wakata ................. C08F 257/02 430/7 |
| 2002/0130913 A1 * | 9/2002 | Murata .................... B41J 29/38 347/14 |

(Continued)

FOREIGN PATENT DOCUMENTS

| CN | 101325175 | 12/2008 |
| CN | 103257470 | 8/2013 |

(Continued)

OTHER PUBLICATIONS

KR 10-2014-0065155, machine translation, originally published 2014, p. 1-15 (Year: 2014).*

(Continued)

*Primary Examiner* — Katherine A Bareford
*Assistant Examiner* — Christina D McClure
(74) *Attorney, Agent, or Firm* — Dentons US LLP

(57) ABSTRACT

The present invention relates to a method for printing touch panel cover glass and a touch panel cover glass manufactured by using the same, the method comprising the steps of: a) inkjet-printing both black ink for a bezel and infrared-transmissive ink on a glass by using two or more inkjet heads; and b) forming a bezel layer and an infrared-transmissive layer by curing the substrate, wherein a gap between the inkjet-printed black ink for a bezel and infrared-transmissive ink printed in the step a) is 1 μm to 500 μm.

7 Claims, 2 Drawing Sheets

(51) Int. Cl.
*B41J 11/00* (2006.01)
*G02B 5/20* (2006.01)
*B41J 2/01* (2006.01)
*G02F 1/1333* (2006.01)

(52) U.S. Cl.
CPC .............. *B41J 2/01* (2013.01); *G02F 1/13338* (2013.01); *G02F 1/133308* (2013.01); *G02F 2001/133331* (2013.01); *G02F 2203/11* (2013.01); *G06F 2203/04103* (2013.01); *G06F 2203/04108* (2013.01)

(58) Field of Classification Search
CPC ...... B41J 2/01; G02B 5/208; G02F 1/133308; G02F 1/13338; G02F 2001/133331; G02F 2203/11
See application file for complete search history.

(56) References Cited

U.S. PATENT DOCUMENTS

| | | | |
|---|---|---|---|
| 2008/0158173 A1* | 7/2008 | Hamblin | G06F 1/1626 345/173 |
| 2010/0078562 A1 | 4/2010 | Dinh et al. | |
| 2012/0170284 A1* | 7/2012 | Shedletsky | G02F 1/13318 362/355 |
| 2012/0295665 A1* | 11/2012 | Pantfoerder | G01J 1/0407 455/566 |
| 2015/0125789 A1* | 5/2015 | Park | G03F 7/038 430/18 |
| 2017/0205669 A1* | 7/2017 | Kotani | G02F 1/133514 |

FOREIGN PATENT DOCUMENTS

| | | | | |
|---|---|---|---|---|
| CN | 203520350 | | 4/2014 | |
| CN | 104571680 | | 4/2015 | |
| CN | 201680057739.3 | | 7/2020 | |
| EP | 2728387 A1 | | 5/2014 | |
| JP | 2007140314 | | 6/1995 | |
| KR | 10-2014-0003046 | | 1/2014 | |
| KR | 10-2014-0047773 | | 4/2014 | |
| KR | 20140047773 A | * | 4/2014 | |
| KR | 10-1472477 | | 12/2014 | |
| WO | WO-2013176517 A1 | * | 11/2013 | ........... G03F 7/0385 |
| WO | WO-2013179237 A1 | * | 12/2013 | ........... C08K 5/3442 |
| WO | WO 2015/178447 A1 | * | 11/2015 | ........... G02F 1/1337 |

OTHER PUBLICATIONS

JP H07-140314, machine translation, originally published 1995, p. 1-7 (Year: 1995).*

KR 20140047773, machine translation, originally published 2014, p. 1-29 (Year: 2014).*

\* cited by examiner

Fig. 1            < Prior Art >
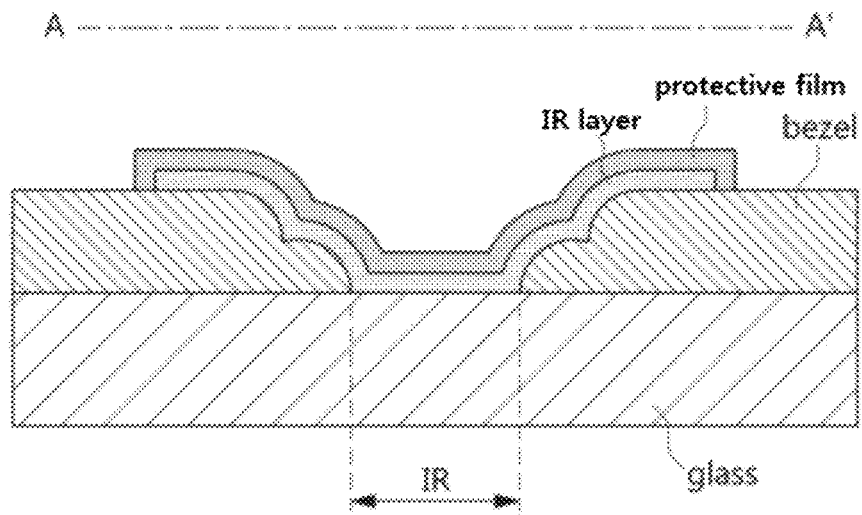
Fig. 2            < Prior Art >
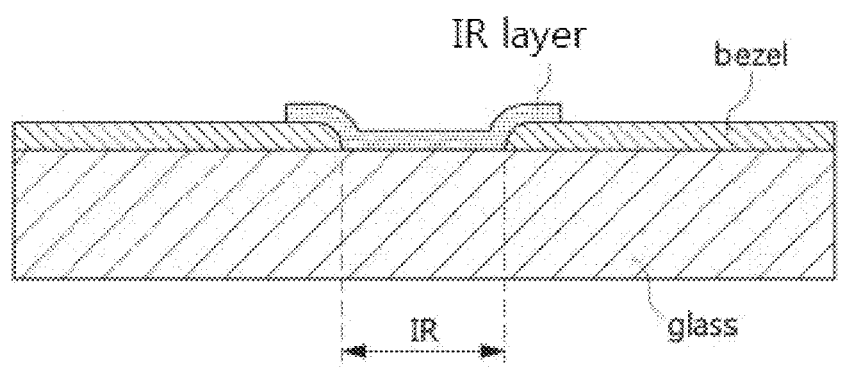

METHOD FOR PRINTING TOUCH PANEL COVER GLASS AND TOUCH PANEL COVER GLASS MANUFACTURED BY USING SAME

This application is a National Stage Application of International Application No. PCT/KR2016/013809 filed on Nov. 28, 2016, which claims priority to and the benefit of Korean Patent Application No. 10-2015-0167978, filed on Nov. 27, 2015, both of which are incorporated herein in their entirety by reference for all purposes as if fully set forth herein.

TECHNICAL FIELD

The present application claims the benefit of priority to Korean Patent Application No. 10-2015-0167978, filed on Nov. 27, 2015, which is incorporated herein by reference in its entirety for all purpose.

The present invention relates to method for printing a touch panel cover glass and a touch panel cover glass manufactured by using the same. More specifically, it relates to a method for printing a touch panel cover glass, which can manufacture a touch panel cover glass through only one process, by controlling a gap between an ink layer for a bezel and an infrared-transmissive ink layer on a touch panel cover glass by an inkjet-printing method using two inkjet heads, and a touch panel cover glass manufactured by using the same.

BACKGROUND ART

Mobile devices including smart phones have become necessities to all modern people, and such mobile devices are developing day by day in their originality or convenience. However, along this growth trend, there are many problems to be solved, and studies to solve the problems have constantly continued. Among the problems, in the process manufacturing a touch panel of the mobile device, transparent electrode pattern was implemented on a display region of the touch panel by forming a bezel and an infrared (Infrared Ray; IR)-transmissive layer for a proximity sensor of the touch panel, and at this time, there was a problem of high process cost because a layer-formation process was needed two or more times to form each layer.

For example, Korean Patent Laid-Open Publication No. 10-2014-0003046 discloses, as shown in FIG. 1, a method for printing a proximity sensor coating layer of a mobile device, i.e., a technique screen printing an IR layer (transmitting IR of the proximity sensor, blocking visible light) on a bezel layer (decoration layer, BM layer) and printing a transparent coating layer for protecting the IR layer thereon.

Further, Korean Patent Laid-Open Publication No. 10-2013-0063570 discloses, as shown in FIG. 2, a technique for preventing discoloration and cracks of an IR ink layer, which can be generated when depositing an electrode on the rear side of a window, by manufacturing the IR ink layer in the form of a tape and adhering thereof on the rear side of the transparent window.

However, such conventional techniques needs two or more processes, for example, manufacturing the bezel layer and manufacturing the IR layer for preventing malfunction of the infrared sensor (proximity sensor) thereon. Thus, there is a problem of high process cost.

DISCLOSURE

Technical Problem

Thus, forming of a bezel layer and an infrared-transmissive layer (IR layer) is absolutely necessary process when manufacturing a touch panel cover glass, and process cost may be reduced if the forming process is completely at a time. However, the conventional process such as screen printing has a problem that this technique cannot print the two layers at the same time, and also there is a problem that print quality and material characteristics may become worse if different inks are mixed each other. Thus, there is an urgent need of an improvement over the problem.

The present invention has been made keeping in mind the above problems in the related art, and an object of the present invention is to provide a method for printing a touch panel cover glass which can print a touch panel cover glass through only one process by simultaneously printing a bezel layer and an infrared-transmissive layer, using two or more inkjet heads, so as to print two or more inks at the desire location, respectively.

Technical Solution

In order to achieve the above object, the present invention provides a method for printing touch panel cover glass comprising the steps of: a) inkjet-printing both black ink for a bezel and infrared-transmissive ink on a glass by using two or more inkjet heads; and b) forming a bezel layer and an infrared-transmissive layer by curing the substrate, wherein a gap between the inkjet-printed black ink for a bezel and infrared-transmissive ink printed in the step a) is 1 μm to 500 μm.

Further, the present invention provides a touch panel cover glass wherein on a glass, a black ink layer for a bezel and an infrared-transmissive ink layer are inkjet-printed on the same plane, and a gap between the inkjet-printed black ink layer for a bezel and infrared-transmissive ink layer is 1 μm to 500 μm.

Further, the present invention provides a touch panel comprising the touch panel cover glass.

Further, the present invention provides a display substrate comprising the touch panel.

Advantageous Effects

According to the method for printing a touch panel cover glass of the present invention, a touch panel cover glass can be manufactured through only one process by simultaneously printing a bezel layer and an infrared-transmissive layer, using two or more inkjet heads, so as to print two or more inks at the desire location, respectively. Therefore, there are advantages that entire process cost can be reduced and also a touch panel with high reliability can be manufactured.

DESCRIPTION OF DRAWINGS

FIG. 1 is a drawing showing a structure of a touch panel cover glass according to the conventional technique.

FIG. 2 is a drawing showing a structure of a touch panel cover glass according to the conventional technique.

MODE FOR INVENTION

Figure 3:
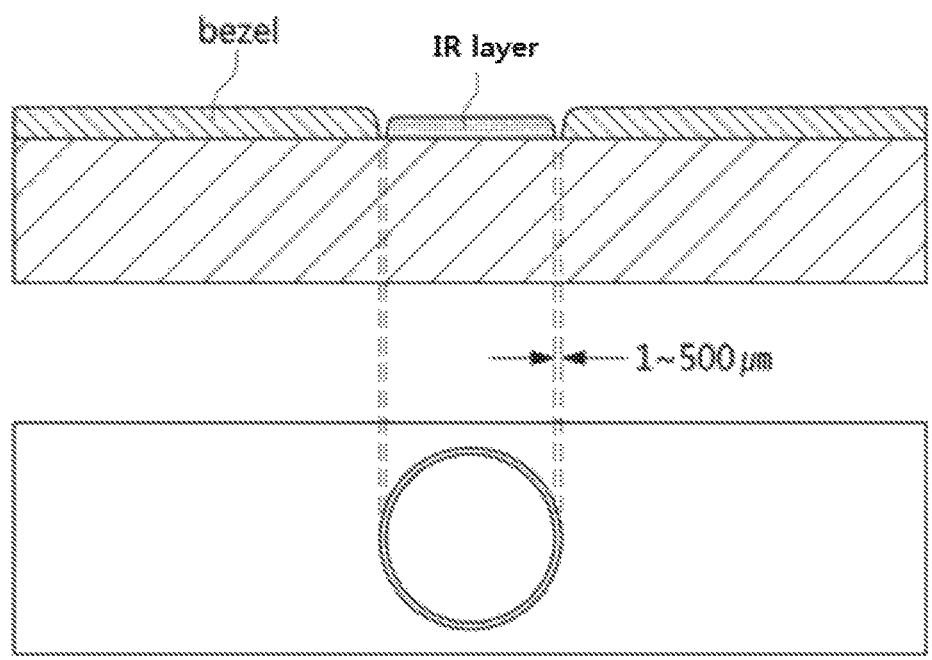
FIG. 3 is a drawing showing a structure of a touch panel cover glass according to the present invention.

Hereinafter, the present invention will be described in detail.

The method for printing a touch panel cover glass according to the present invention is characterized by comprising the steps of: a) inkjet-printing both black ink for a bezel and infrared-transmissive ink on a glass by using two or more inkjet heads; and b) forming a bezel layer and an infrared-transmissive layer by curing the substrate, wherein a gap between the inkjet-printed black ink for a bezel and infrared-transmissive ink printed in the step a) is 1 µm to 500 µm.

First, in the step a) of the method for printing a touch panel cover glass according to the present invention, both the black ink for a bezel and the infrared-transmissive ink are simultaneously inkjet-printed on a glass by using two or more inkjet heads.

Referring to FIG. 3, in the step a), both the black ink for a bezel and the infrared-transmissive ink are simultaneously inkjet-printed on the glass.

The glass may be any one used in the art without particular limitation.

The black ink for a bezel may be any one used in the art without particular limitation, and preferably, it may be carbon black or titanium black having composition of a black pigment, an oligomer, a multifunctional monomer, a 1- to 3-functional monomers, an adhesive enhancer, a polymerization inhibitor, a surfactant and the like. Further, the black ink for a bezel may be one which can form pattern by an inkjet method, and has the viscosity of 1 cP to 50 cP and the surface tension of 18 N/m to 40 N/m at a room temperature (25° C.).

The infrared-transmissive ink may be any one used in the art without particular limitation, and preferably, it may be lactam black or a perylene black having high infrared transmissivity, which has composition of a black pigment, an oligomer, a multifunctional monomer, a 1- to 3-functional monomers, an adhesive enhancer, a polymerization inhibitor, a surfactant and the like. Further, the infrared-transmissive ink may be one which can form pattern by an inkjet method, and has the viscosity of 1 cP to 50 cP and the surface tension of 18 N/m to 40 N/m at a room temperature (25° C.).

The method for printing a touch panel cover glass according to the present invention may use two or more inkjet heads in order to use two or more kinds of ink as mentioned above, and each inkjet head prints out only the color set on an image file.

When inkjet-printing an image containing information about two colors of the bezel layer and the infrared-transmissive layer located at different places by using the two or more inkjet heads, each of the inkjet heads simultaneously prints different ink. However, as the different inks are printed at the same time, print quality becomes poor because the inks are mixed in the boundary between the inks, and in particular, characteristics of the infrared-transmissive layer (IR layer) become worse.

For this, in order to develop a process method having excellent print quality and characteristics because the method can simultaneously print two different inks but the inks are not mixed each other, in the step a), the gap between the inkjet-printed black ink for a bezel and infrared-transmissive ink can be set to 1 µm to 500 µm, and more preferably, the gap between the inkjet-printed black ink for a bezel and infrared-transmissive ink can be set to 1 µm to 100 µm. If the gap between the inkjet-printed black ink for a bezel and infrared-transmissive ink is less than 1 µm, there may be a problems that print quality is deteriorated as the two different inks are mixed, and if the gap between the inkjet-printed black ink for a bezel and infrared-transmissive ink is more than 500 µm, there may be a problem that the infrared sensor is malfunctioned because visible light is entered through a unprinted part.

In the present invention, after printing the bezel layer and the infrared-transmissive layer through one process as mentioned above, the substrate is cured in the step b) to form the bezel layer and the infrared-transmissive layer.

The curing method may preferably be an ultraviolet (UV) curing or heat curing method without particular limitation.

First, when curing by irradiating UV, UV having the intensity of 1000 mJ/cm$^2$ to 20000 mJ/cm$^2$ may preferably be irradiated without particular limitation.

Further, when curing by heating, an oven or hat plate may preferably be used for heat curing without particular limitation. The heat curing may be conducted at a condition of 150° C. to 220° C. and 10 min to 30 min without particular limitation.

The thickness of the bezel layer cured as mentioned above may be 2 µm to 10 µm, and it may be 4 µm to 6 µm, if necessary.

The optical density of the cured bezel layer may be 4 to 6, and it may be 4.5 to 5.5, if necessary. In this case, there is an advantage of excellent shielding characteristic by bezel pattern. If the optical density is higher than 6, it may cause deterioration of the UV curing sensitivity, and it may be difficult to form pattern due to the increased amount of shielding material added to realize the optical density.

Further, the cured bezel may have the surface hardness of 4H or higher, the adhesive force of 5B and the like those are required for the bezel performance.

Further, the thickness of the infrared-transmissive layer cured as mentioned above may be 2 µm to 10 µm, and it may be 4 µm to 6 µm, if necessary.

The infrared-transmissive layer cured like this has an advantage of maintaining the transmissivity in an infrared wavelength region (850 nm to 940 nm at 80% or higher (for example, the transmissivity at 850 nm is 82%, and the transmissivity at 940 nm is 83%), and the transmissivity in a visible light wavelength region (550 nm) at 20%.

FIG. 3 shows a touch panel cover glass according to the printing method of the present invention. As shown in FIG. 3, the bezel layer is printed (inkjet) and at the same time the IR layer is printed (inkjet), and then the layers are cure. Thus, it is possible to reduce process time and cost spent for printing the bezel layer and the IR layer.

In order to develop a touch panel cover glass having excellent print quality and characteristics because two different inks are not mixed each other while printing with the two different inks, as illustrated in FIG. 3, a constant gap is formed between the black ink layer for a bezel and the infrared-transmissive ink layer.

Thus, in the touch panel cover glass of the present invention, the gap between the black ink layer for a bezel and the infrared-transmissive ink layer inkjet-printed on the same plane of the glass may be limited from 1 µm to 500 µm, and more preferably, the gap between the inkjet-printed black ink layer for a bezel and infrared-transmissive ink layer may be 1 µm to 100 µm. If the gap between the inkjet-printed black ink layer for a bezel and infrared-transmissive ink layer is narrow than 1 µm, there may be a problem that print quality becomes poor because the two different inks are mixed each other, and if the gap between the inkjet-printed black ink layer for a bezel and infrared-transmissive ink layer is wider than 500 µm, there may be a problem of malfunction of the infrared sensor because visible light is entered through the unprinted part.

Further, the thickness of the bezel layer of the touch panel cover glass according to the present invention may be 2 µm to 10 µm, and it may be 4 µm to 6 µm, if necessary.

Further, the optical density of the bezel layer of the touch panel cover glass according to the present invention may be 4 to 6, and it may be 4.5 to 5, if necessary. In the case, there is an advantage of excellent shielding characteristic by bezel pattern. If the optical density is higher than 6, it may cause deterioration of the UV curing sensitivity, and it may be difficult to form pattern due to the increased amount of shielding material added to realize the optical density.

Further, the bezel of the touch panel cover glass according to the present invention may show the performance required for bezel such as the surface hardness of 4H or higher, the adhesive force of 5B and the like.

Further, the thickness of the infrared-transmissive layer of the touch panel cover glass according to the present invention may be 2 μm to 10 μm, and it may be 4 μm to 6 μm, if necessary.

The infrared-transmissive layer cured like this has an advantage of maintaining the transmissivity in an infrared wavelength region (850 nm to 940 nm) at 80% or higher (for example, the transmissivity at 850 nm is 82%, and the transmissivity at 940 nm is 83%), and the transmissivity in a visible light wavelength region (550 nm) at 20%.

Further, the touch panel cover glass according to the present invention may be applied to a touch panel used in the art.

Further, the touch panel according to the present invention may be applied to various display substrates by being combined with a liquid crystal module.

BEST MODE CARRYING OUT THE INVENTION

The present invention will be explained in detail with reference to the following examples, including test examples. However, these examples are provided for illustrative purposes only and are not intended to limit the scope of the invention.

EXAMPLE

Manufacturing Ink Composition
[Ink Composition 1]

Base on the total weight of the whole ink composition, 60 wt % of a pigment dispersion (carbon black 30 wt %, acryl-based dispersant 6 wt %, HPNDA 64 wt %), 10 wt % of DPHA as a multifunctional monomer, 18 wt % of 2-HEA as a monofunctional monomer, 3 wt % of an adhesive enhancer KBM-403, 2 wt % of an epoxy binder (PD-7610, Almatex), 5 wt % of Irgacure 907 as a photo-initiator, 2 wt % of ITX as a photo-initiator, 0.05 wt % of a polymerization inhibitor, and 0.05 wt % of a surfactant BYK-307 are mixed, and then the mixture was stirred for 6 hours to manufacture a black ink composition for a bezel.

[Ink Composition 2]

Base on the total weight of the whole ink composition, 25 wt % of a pigment dispersion (lactam black 20 wt %, acryl-based dispersant 4 wt %, HPNDA 76 wt %), 12 wt % of DPHA as a multifunctional monomer, 25 wt % of TMPTA as a 3-functional monomer, 23.5 wt % of 2-HEA as a monofunctional monomer, 5 wt % of an adhesive enhancer KBM-403, 2 wt % of an epoxy binder (PD-7610, Almatex), 5 wt % of Irgacure 907 as a photo-initiator, 2 wt % of ITX as a photo-initiator, 0.05 wt % of a polymerization inhibitor, and 0.5 wt % of a surfactant RS-75 are mixed, and then the mixture was stirred for 6 hours to manufacture an infrared-transmissive ink composition.

Manufacturing Cover Glass

Example 1

Using 2 inkjet heads, the black ink composition for a bezel of the ink composition 1 and the infrared-transmissive ink composition of the ink composition 2 were inkjet-printed on a glass (width: 70 mm, length: 120 mm, and height: 0.5 μm) to the thickness of 5 μm to manufacture a sample having a black ink layer for a bezel and an infrared-transmissive ink layer. An image gap between the black ink layer for a bezel and the infrared-transmissive ink layer was 1 μm, and the sample was UV cured using a UV LED lamp of 395 nm wavelength. In order to enhance the adhesive force, the cured sample was heated at 200° C. for 15 min to manufacture a cover glass.

Example 2

The procedure of Example 1 was repeated except for forming the image gap between the black ink layer for a bezel and the infrared-transmissive ink layer at 10 μm to manufacture a cover glass.

Example 3

The procedure of Example 1 was repeated except for forming the image gap between the black ink layer for a bezel and the infrared-transmissive ink layer at 100 μm to manufacture a cover glass.

Example 4

The procedure of Example 1 was repeated except for forming the image gap between the black ink layer for a bezel and the infrared-transmissive ink layer at 400 μm to manufacture a cover glass.

Comparative Example 1

The procedure of Example 1 was repeated except for forming the image gap between the black ink layer for a bezel and the infrared-transmissive ink layer at 0 μm to manufacture a cover glass.

Comparative Example 2

The procedure of Example 1 was repeated except for forming the image gap between the black ink layer for a bezel and the infrared-transmissive ink layer at 500 μm to manufacture a cover glass.

Comparative Example 3

The procedure of Example 1 was repeated except for forming the image gap between the black ink layer for a bezel and the infrared-transmissive ink layer at 600 μm to manufacture a cover glass.

Test Example

For the cover glasses manufactured in Example 1 to Example 4 and Comparative Example 1 to Comparative Example 3, the infrared sensor performance, the print quality, the surface hardness and the adhesive force were tested as follows, and the results are shown in the following Table 1.

The infrared sensor performance was measured by a light proximity sensor module and whether the sensor is normally operated or not when the light emitted from an IR LED is reflected and then entered into the sensor. The print quality was observed under a microscope, and whether the two printed layers are overlapped or not was checked.

Further, the surface hardness was measured using a pencil hardness tester under conditions of load of 1 kg, scratch angle of 45 degree(°) and rate of 3 mm/s (Standard: ASTM D3363), and the adhesive force was measured by conducting cross cut test and evaluated from 0 B to 5 B (Standard: ASTM D3002, D3359).

TABLE 1

| | Exam. 1 | Exam. 2 | Exam. 3 | Exam. 4 | Comp. Exam. 1 | Comp. Exam. 2 | Comp. Exam. 3 |
|---|---|---|---|---|---|---|---|
| Image gap (μm) | 1 | 10 | 100 | 400 | 0 | 500 | 600 |
| Print quality | OK | OK | OK | OK | NG | OK | OK |
| Infrared sensor performance | OK | OK | OK | OK | OK | NG | NG |
| Surface hardness | 4H | 4H | 4H | 4H | 4H | 4H | 4H |
| Adhesive force | 5B | 5B | 5B | 5B | 5B | 5B | 5B |

It can be confirmed that the touch panel cover glasses of Example 1 to Example 4 manufactured by the printing method of the present invention had good print quality and also had excellent infrared sensor performance. Further, it can be confirmed that the touch panel cover glasses manufactured by the printing method of the present invention also had excellent surface hardness and adhesive force.

However, Comparative Example 1 without image gap had a problem of bad print quality as the inks were mixed each other, and Comparative Examples 1 and 2 with too wide image gap had a problem of poor infrared sensor performance because visible light was transmitted through the infrared-transmissive ink layer and the light emitted from the light emitting part (IR LED) of the infrared sensor was not properly recognized at the light receiving part (sensor).

The invention claimed is:

1. A method for printing a touch panel cover glass, comprising the steps of:
    a) simultaneously inkjet-printing both a black ink for a bezel and an infrared-transmissive ink on a glass by using two or more inkjet heads, wherein:
        a gap between the inkjet-printed black ink for a bezel and the infrared-transmissive ink is 1 μm to 500 μm;
        the black ink for a bezel comprises a black pigment, an oligomer, a multifunctional monomer, a 1- to 3-functional monomer, an adhesive enhancer, a polymerization inhibitor, and a surfactant, wherein the black pigment is at least one of carbon black and titanium black, and the black ink has a surface tension of 18 N/m to 40 N/m at 25° C.; and
        the infrared-transmissive ink comprises a black pigment, an oligomer, a multifunctional monomer, a 1- to 3-functional monomer, an adhesive enhancer, a polymerization inhibitor, and a surfactant, wherein the black pigment is at least one of lactam black and perylene black, and the infrared-transmissive ink has a surface tension of 18 N/m to 40 N/m at 25° C.; and
    b) forming a bezel layer and an infrared-transmissive layer by curing the substrate by irradiating with UV light at an intensity of from 1000 mJ/cm$^2$ to 20000 mJ/cm$^2$,
    wherein the gap between the inkjet-printed black ink for a bezel and the infrared-transmissive ink is maintained after curing to yield the touch panel cover glass that includes the gap between the inkjet-printed black ink for a bezel and the infrared-transmissive ink, and
    wherein the surface hardness of the bezel layer cured in the step b) is 4H or higher.

2. The method for printing a touch panel cover glass according to claim 1, wherein the gap between the inkjet-printed black ink for a bezel and infrared-transmissive ink printed in the step a) is 10 μm to 100 μm.

3. The method for printing a touch panel cover glass according to claim 1, wherein:
    the thickness of the bezel layer cured in the step b) is 2 μm to 10 μm; and
    the thickness of the infrared-transmissive layer cured in the step b) is 2 μm to 10 μm.

4. The method for printing a touch panel cover glass according to claim 1, wherein the optical density of the bezel layer cured in the step b) is 4 to 6.

5. The method for printing a touch panel cover glass according to claim 1, wherein the transmissivity of the infrared-transmissive layer cured in the step b) in an infrared wavelength region is 80% or higher.

6. The method for printing a touch panel cover glass according to claim 1, wherein the transmissivity of the infrared-transmissive layer cured in the step b) in a visible light wavelength region is 20% or lower.

7. The method for printing a touch panel cover glass according to claim 1, further comprising heating the cured bezel layer and cured infrared-transmissive layer at a temperature in a range of 150° C. to 220° C. and for a period of time in the range of from 10 min to 30 min to enhance adhesion to the glass.

* * * * *